US011060792B2

(12) United States Patent
Sane et al.

(10) Patent No.: US 11,060,792 B2
(45) Date of Patent: Jul. 13, 2021

(54) OXY-FUEL COMBUSTION SYSTEM AND METHOD FOR MELTING A PELLETED CHARGE MATERIAL

(71) Applicant: Air Products and Chemicals, Inc., Allentown, PA (US)

(72) Inventors: Anup Vasant Sane, Allentown, PA (US); Gregory J. Buragino, Fogelsville, PA (US); Anandkumar Makwana, Breinigsville, PA (US); Michael David Buzinski, Slatington, PA (US); Xiaoyi He, Orefield, PA (US); Mark Daniel D'Agostini, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 113 days.

(21) Appl. No.: 16/352,642

(22) Filed: Mar. 13, 2019

(65) Prior Publication Data
US 2019/0293351 A1     Sep. 26, 2019

Related U.S. Application Data

(60) Provisional application No. 62/647,040, filed on Mar. 23, 2018.

(51) Int. Cl.
*F27B 9/02*      (2006.01)
*F27B 9/20*      (2006.01)
(Continued)

(52) U.S. Cl.
CPC ............. *F27B 9/028* (2013.01); *F27B 9/202* (2013.01); *F27B 9/30* (2013.01); *F27D 3/0025* (2013.01);
(Continued)

(58) Field of Classification Search
CPC .. F27B 9/028; F27B 9/202; F27B 9/30; F27D 3/0025; F27D 2003/0006
See application file for complete search history.

(56) References Cited

U.S. PATENT DOCUMENTS 3,701,517 A * 10/1972 Gray ...................... C21B 5/001
                                                                     266/222
4,008,884 A      2/1977 Fitzpatrick et al.
(Continued)

FOREIGN PATENT DOCUMENTS

CA          1327274         3/1994
CN         101265510       9/2008
(Continued)

OTHER PUBLICATIONS

Baukal, C.E., et al.; "Heat Transfer from Oxygen-Enhanced/Natural Gas Flames Impinging Normal to a Plane Surface"; Experimental Thermal and Fluid Science 16; 1998; pp. 247-259; Elsevier Science Inc.
(Continued)

*Primary Examiner* — Scott R Kastler
(74) *Attorney, Agent, or Firm* — Larry S. Zelson

(57) ABSTRACT

A system for melting a pelleted charge material including a furnace having a feed end configured to receive a solid pelleted charge material and a discharge end opposite the feed end configured to discharge a molten charge material and a slag, a conveyor configured to feed the pelleted charge material into the feed end of the furnace, at least one oxy-fuel burner positioned to direct heat into a melting zone near the feed end to heat and at least partially melt the pelleted charge material to form the molten charge material and slag, wherein the oxy-fuel burner uses an oxidant having at least 70% molecular oxygen, and at least one flue for exhausting burner combustion products from the furnace.

10 Claims, 17 Drawing Sheets

(51) Int. Cl.
*F27D 3/00* (2006.01)
*F27B 9/30* (2006.01)
*F27B 9/38* (2006.01)

(52) U.S. Cl.
CPC *F27B 2009/382* (2013.01); *F27D 2003/0006* (2013.01)

(56) References Cited

U.S. PATENT DOCUMENTS

| | | | |
|---|---|---|---|
| 4,306,903 A * | 12/1981 | Beggs | C21B 13/12 75/10.38 |
| 4,456,476 A * | 6/1984 | Sherwood | C21B 13/085 75/509 |
| 5,163,997 A * | 11/1992 | Sherwood | C21B 13/085 75/527 |
| 5,688,339 A | 11/1997 | Farmer et al. | |
| 6,063,156 A | 5/2000 | Negami et al. | |
| 8,277,720 B2 | 10/2012 | Axelsson et al. | |
| 2007/0160948 A1 | 7/2007 | Gartz | |
| 2009/0025511 A1 | 1/2009 | Negami et al. | |
| 2009/0031859 A1 | 2/2009 | Tsuge et al. | |
| 2019/0017745 A1 | 1/2019 | Buragino et al. | |

FOREIGN PATENT DOCUMENTS

| | | |
|---|---|---|
| CN | 101367029 | 2/2009 |
| EP | 1127171 | 8/2001 |
| EP | 0987508 | 12/2003 |
| EP | 1 979 495 B1 | 7/2011 |
| EP | 2 267 171 B1 | 1/2015 |
| JP | 09323159 | 12/1997 |
| JP | 2002241820 | 8/2002 |
| JP | 2009532661 | 9/2009 |
| KR | 1020000068375 | 11/2000 |
| RU | 2025499 | 12/1994 |
| WO | 01/17910 A1 | 3/2001 |
| WO | 2011/126427 A1 | 10/2011 |
| WO | 2014/053657 A1 | 4/2014 |

OTHER PUBLICATIONS

Baukal, C.E., et al.; "Surface Condition Effects on Flame Impingement Heat Transfer"; Experimental Thermal and Fluid Science 15; 1997; pp. 323-335; Elsevier Science Inc.

* cited by examiner

OXY-FUEL COMBUSTION SYSTEM AND METHOD FOR MELTING A PELLETED CHARGE MATERIAL

CROSS-REFERENCE TO RELATED APPLICATIONS

This application claims the priority of U.S. Provisional Patent Application No. 62/647,040 filed Mar. 23, 2018, which is incorporated by reference herein in its entirety.

BACKGROUND

To the best of the inventors' knowledge, combustion is not currently used for melting of direct reduced iron (DRI) or hot briquetted iron (HBI) (or more generally, iron-containing pellets or iron pellets). Typically, DRI is produced in one facility and transported to another facility to be melted in an electric arc furnace (EAF). Transportation of DRI poses material handling challenges. Additionally, DRI, when produced, is hot and typically needs to be cooled down for transportation. Further, DRI which has lower metallization than pig iron, is a lower grade iron source for melting in an EAF. It contains higher amount of slag compared to pig iron. Additionally, porosity of the pellets makes it challenging to melt DRI with electrical energy. As a result, DRI is not as efficient a source of iron as pig iron for electrical steel making, such that converting DRI into pig iron, prior to transport and/or prior to charging into an electric arc furnace, makes sense if it can be done at low cost.

SUMMARY

A system is described herein for melting a pelleted charge material comprising: a furnace having a feed end, a discharge end, and a bottom, wherein solid pelleted charge material is fed into the feed end and molten charge material and slag are discharged from the discharge end; a conveyor for feeding the pelleted charge material into the feed end of the furnace; at least one oxy-fuel burner positioned in a melting zone near the feed end to heat and at least partially melt the pelleted charge material to form a molten charge material, wherein the oxy-fuel burner uses an oxidant having at least 70% molecular oxygen; and at least one flue for exhausting burner combustion products from the furnace.

The pelleted charge material may comprise one or more of iron pellets, direct reduced iron pellets, and hot briquetted iron pellets, lump or fines In one embodiment, at least a portion of the bottom of the furnace is sloped downward from the feed end toward the discharge end to enable gravity to assist in moving charge material from the feed end to the discharge end.

In another embodiment, a mechanism is provided for separating the slag from the molten charge material, wherein the mechanism may be located near the discharge end or near the entrance end to ensure that slag is always floating above the melt and can be separated.

In another embodiment, the furnace has a length and a width, wherein the iron moves in a lengthwise direction and is fed and discharged across the width, the length being at least twice the width.

The feeder conveyor/transport may alternate feeding across the width to allow even spread of charge material and time to melt.

In another embodiment, a preheater may be positioned adjacent to the feed end of the furnace having an energy input device for preheating the pelleted charge material prior to the charge material being fed into the furnace.

For the preheater, the energy input device may include one or more of a burner, without or without a flue configured to discharge at least a portion of the burner combustion products from the furnace The energy input device of the preheater may be configured to heat the pelleted charge material on the conveyor, or may be configured to heat the pelleted charge material in a preheater furnace configured to discharge preheated pelleted charge material onto the conveyor.

In another embodiment, a flue is located in the melting zone of the furnace for enhancing heat transfer to the pelleted charge material.

In another embodiment, a controller may be programmed to operate the at least one burner in the melting zone in a fuel-rich mode to inhibit oxidation of the charge material. In addition, at least one oxygen injector may be positioned downstream of the melting zone to complete combustion of fuel-rich combustion products from the at least one burner in the melting zone.

In another embodiment, the at least one burner is a direct-impingement burner producing a flame that directly impinges the pelleted charge material to maximize heat transfer to the pelleted charge material.

In another embodiment, the at least one burner downstream of the melting zone capable of injecting direct reduced iron fines into the furnace.

In another embodiment, at least one roof mounted burner is also provided in the furnace downstream of the melting zone for providing heat to the molten charge material.

In another embodiment, at least one pair of sidewall mounted burners is also positioned on opposite sidewalls of the furnace downstream of the melting zone for providing heat to the molten charge material.

In another embodiment, a controller is programmed to operate the at least one burner in the melting zone in a fuel-rich mode to inhibit oxidation of the charge material and to operate the at least one pair of sidewall mounted burners downstream of the melting zone in a fuel-lean mode to complete combustion of fuel-rich combustion products from the at least one burner in the melting zone.

In another embodiment, a stirring mechanism is provided for stirring the molten charge material and facilitating mixing of the pelleted charge material into the molten charge material in the melting zone. The stirring mechanism may include one or more bottom or side stir nozzles for injecting an inert gas through the bottom or charge wall of the furnace. Alternatively, the stirring mechanism may include an electromechanical stirring device.

In another embodiment, one or more sensors are used to gather data and a controller is programmed to use the data to regulate operation of the at least one burner in the melting zone.

In another embodiment, a de-slagging apparatus is employed for breaking up slag on the surface of the molten charge. The de-slagging apparatus may include a device for injecting de-slagging flux into the furnace.

Aspect 1. A system for melting a pelleted charge material comprising: a furnace having a feed end configured to receive a solid pelleted charge material and a discharge end opposite the feed end configured to discharge a molten charge material and a slag; a conveyor configured to feed the pelleted charge material into the feed end of the furnace; at least one oxy-fuel burner positioned to direct heat into a melting zone near the feed end to heat and at least partially melt the pelleted charge material to form the molten charge material and slag, wherein the oxy-fuel burner uses an oxidant having at least 70% molecular oxygen; and at least one flue for exhausting burner combustion products from the furnace.

Aspect 2. The system of Aspect 1, wherein the furnace has a length and a width, wherein the charge material moves horizontally in a lengthwise direction from the feed end to the discharge end, and wherein the at least one burner is positioned near the feed end, the length being at least twice the width.

Aspect 3. The system of Aspect 2, wherein at least a portion of the bottom is sloped downward from the feed end toward the discharge end to enable gravity to assist in moving charge material from the feed end to the discharge end.

Aspect 4. The system of Aspect 1, wherein the furnace is a rotary furnace having a curved sidewall spanning between the feed end and the discharge end.

Aspect 5. The system of Aspect 4, wherein the at least one burner and the flue are both positioned at or near the feed end of the furnace.

Aspect 6. The system of Aspect 4, wherein the at least one burner is positioned in the sidewall of the furnace.

Aspect 7. The system of Aspect 1, wherein the furnace is a shaft furnace with the feed end being a top end and the discharge end being in a sidewall of a bottom end, and wherein the at least one burner is arranged to fire into the furnace from a sidewall.

Aspect 8. The system of Aspect 1, wherein the pelleted charge material comprises one or more of iron pellets, direct reduced iron pellets, and hot briquetted iron pellets.

Aspect 9. The system of Aspect 1, further comprising a mechanism for separating the slag from the molten charge material.

Aspect 10. The system of Aspect 1, further comprising: a preheater adjacent to the feed end of the furnace having an energy input device for preheating the pelleted charge material prior to the charge material being fed into the furnace.

Aspect 11. The system of Aspect 10, wherein the energy input device includes a burner and a flue configured to discharge at least a portion of the burner combustion products from the furnace, and wherein the energy input device heats the pelleted charge material on the conveyor.

Aspect 12. The system of Aspect 10, wherein the energy input device heats the pelleted charge material in a preheater furnace configured to discharge preheated pelleted charge material onto the conveyor.

Aspect 13. The system of Aspect 1, further comprising a controller programmed to operate the at least one burner in the melting zone in a fuel-rich mode to inhibit oxidation of the charge material.

Aspect 14. The system of Aspect 1, wherein the at least one burner is a direct-impingement burner producing a flame that directly impinges the pelleted charge material to maximize heat transfer to the pelleted charge material.

Aspect 15. The system of Aspect 1, further comprising at least one burner downstream of the melting zone configured to inject direct reduced iron fines into the furnace.

Aspect 16. The system of Aspect 1, further comprising a stirring mechanism for stirring the molten charge material and facilitating mixing of the pelleted charge material into the molten charge material in the melting zone, wherein the stirring mechanism is selected from the group consisting of: one or more bottom stir nozzles for injecting an inert gas through the bottom of the furnace, and an electromechanical stirring device.

BRIEF DESCRIPTION OF THE DRAWINGS

The present invention will hereinafter be described in conjunction with the appended figures wherein like numerals denote like elements.

DETAILED DESCRIPTION

Figure 1:
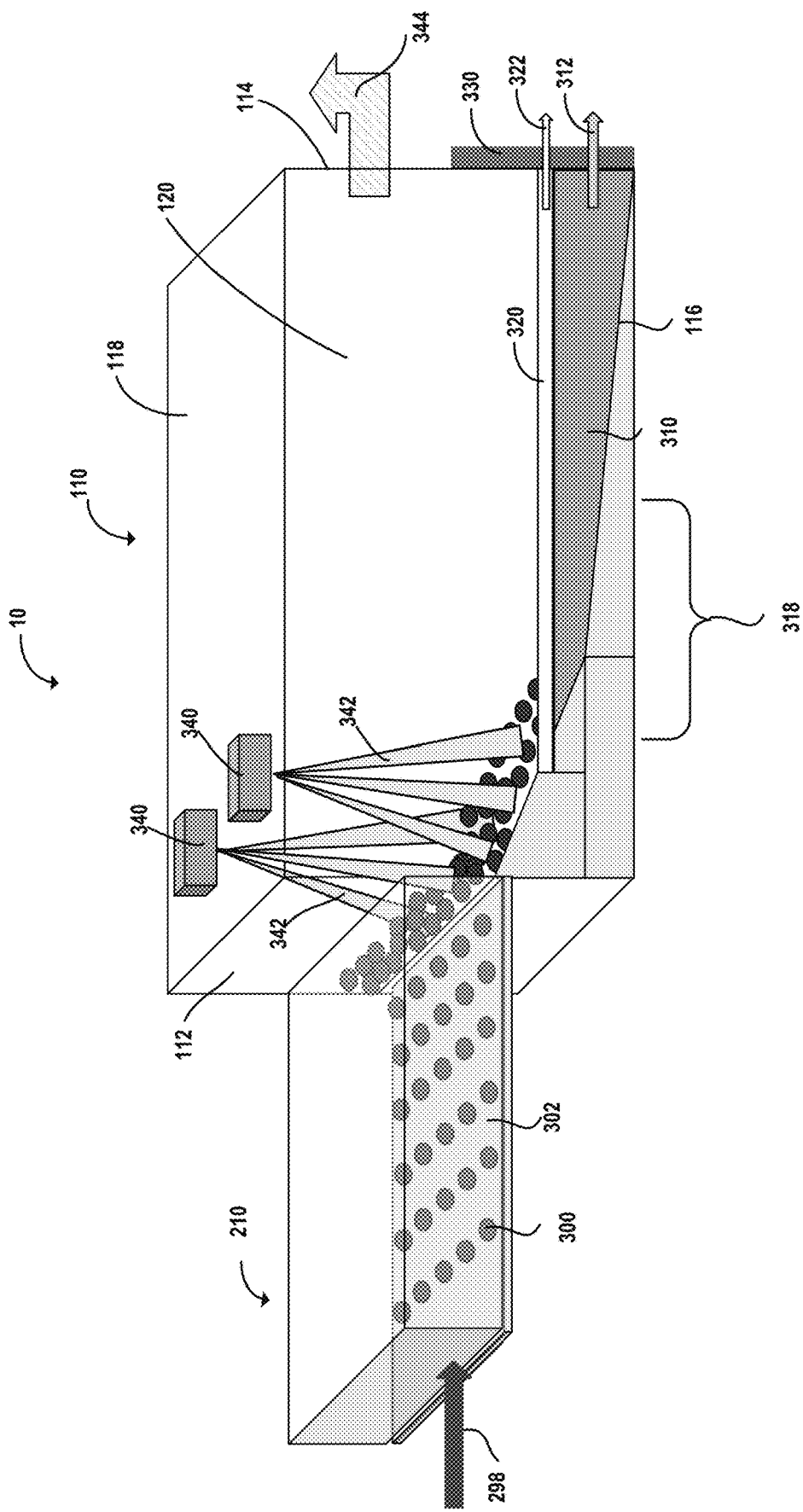
FIG. 1 is a schematic side perspective view of an embodiment of a iron melting system employing roof mounted melting burners in a melting zone of a continuous or semi-continuous melting furnace.

DRI plants are fast replacing traditional forms of iron ore processing such as blast furnaces because of higher usage of natural gas in DRI-making processes leading to lower carbon emissions compared to blast furnaces which require coke. Natural gas is preferred because it is a lower-carbon containing, more economically available fuel source compared to coal and coke. DRI plants are usually located closer to mining operations or where natural gas is cheaper and not necessarily close to steel mill operations. DRI particularly is not an ideal raw material for electric steel making, due to its higher melting temperature (about 1350° C.), higher porosity and less metallic iron content (about 85%). Instead, pig iron with higher iron content (about 95%) and lower melting temperature (about 1250° C.) is a better source of virgin iron units. Therefore, most of the mills today end up would prefer buying pig iron for steel making rather than DRI if pig iron were available and economical. Thus, there exists a need for a low cost and environmentally friendly process to convert DRI to pig iron. Availability of inexpensive natural gas in the US makes a combustion-based process economically attractive.

The present inventors propose a system and method of melting cold (or hot) DRI using oxy-fuel burners. Preferably, the burners use natural gas as fuel and oxygen or oxygen-enriched air as oxidizer, wherein the oxidizer has at least 30% molecular oxygen, preferably at least 70% molecular oxygen, more preferably is industrial grade oxygen.

Additionally, use of a melting furnace (melter) in conjunction with a preheater is expected to provide higher heat transfer efficiency and reduced firing rate requirements in melting zone, as compared with using a melting furnace alone. A preheater provides increased residence time for heating, as well as an opportunity to heat the pelletized iron when more surface area is exposed.

DRI is typically produced in a pelleted form, wherein the pellets have a size range of 0.25-2 cm, an average size of about 1 cm, and also include some much smaller fines. For clarity, the systems and processes herein is not restricted to pelleted material per se, and will operate well for material in granulated or lump or other similar forms.

Various arrangements of an iron melting system are shown in FIGS. 1-9 and 14-15. Each embodiment of the iron melting system has some common elements or features, with the embodiments of FIGS. 1-9 sharing the same basic structural arrangement. In broad outline, the furnace of FIGS. 1-9 is a continuous long furnace preferably rectangular in shape, where pelleted iron (preferably preheated in a preheater) enters through the feed end and molten metal is taken out at a continuous rate from the discharge end. The slag layer floats on top of the molten metal and is also taken out at continuous rate, separated as described above from the molten metal. Burners at the feed end of the furnace efficiently transfer heat to the incoming iron pellets. The softened iron pellets then enter a bath of liquid metal already in the furnace. The liquid metal bath moves slowly toward the discharge end and is tapped out of the furnace. Horizontal-fired burners may be positioned over the liquid bath so as to effectively transfer heat via radiation. Burners are tuned in a way to produce a minimal slag layer required by process chemistry. Slag viscosity is preferably managed such that the slag can flow freely however is not allowed to foam. The slag may also be disrupted or broken up by mechanical agitation, fluid agitation by high momentum gases, or by altering the slag chemistry. Carbon in form of coke/coal or through natural gas is added to the process. The molten metal can be tapped as hot metal or converted to granulated pig iron through rapid cooling or using a pigging caster.

As shown in detail in FIG. 1, an iron melting system 10 includes a melting furnace 110 and a preheater 210. A charge 298 of pelleted iron (DRI) 300 is fed into the preheater 210 and is transported by a conveyor 302 to a feed end 112 of the melting furnace 110. The furnace also includes a discharge end 114 opposite the feed end 112, and a bottom 116, a roof 118, and sidewalls 120 spanning the length of the furnace 110 from the feed end 112 to the discharge end 114. A region of the furnace 110 proximal to the feed end 112 is designated as a melting zone 318, because in this region pelleted iron 300 is melted to form a molten charge 310. Although a mechanical conveyor is depicted herein, a pneumatic conveyor or other material conveyance system could be used. In some instances, the conveyor is preferably atmosphere controlled to minimize the risk of oxidizing the pellets.

Also, to enhance melting and avoid accumulation of too large a concentration of pellets in one particular spot in the furnace, the feeder conveyor may disperse the feed across the width to allow even spread of charge material and time to melt. In one embodiment, the conveyor may move from side to side to accomplish this dispersion.

As the iron pellets 300 are charged into the feed end 112 of the furnace 110, they are heated by combustion products from at least one oxy-fuel burner 340 mounted in the roof 118. The oxy-fuel burner 340 may be a direct impingement burner, meaning that the flame 342 emitted by the burner 340 impinges directly on the pelleted iron 300 to increase the convective heat transfer rate to the iron pellets 300. Alternatively, or in combination, the oxy-fuel burner 340 may produce a highly radiant flame capable of achieving significant radiant heat transfer to the iron pellets 300.

To facilitate or enhance transport of the charge material from the feed end 112 to the discharge end 114, at least a portion of the bottom 116 of the furnace 110 may be sloped downward from the feed end 112 toward the discharge end 114.

During the melting and heating process, slag 320 often forms on a top surface of the molten charge 310. Upon discharge from the discharge end 114 of the furnace, a separation mechanism 330 separates the slag 320 from the molten charge 310. The separation mechanism 330 may include a splitter plate, a diversion paddle, a weir, a moveable gate, or another other mechanism for separating the slag 320 from the molten charge 310 to produce an output slag stream 322 and an output molten charge stream 312. The slag can be taken out through a separate hole than where the hot metal is poured out.

Figure 2:
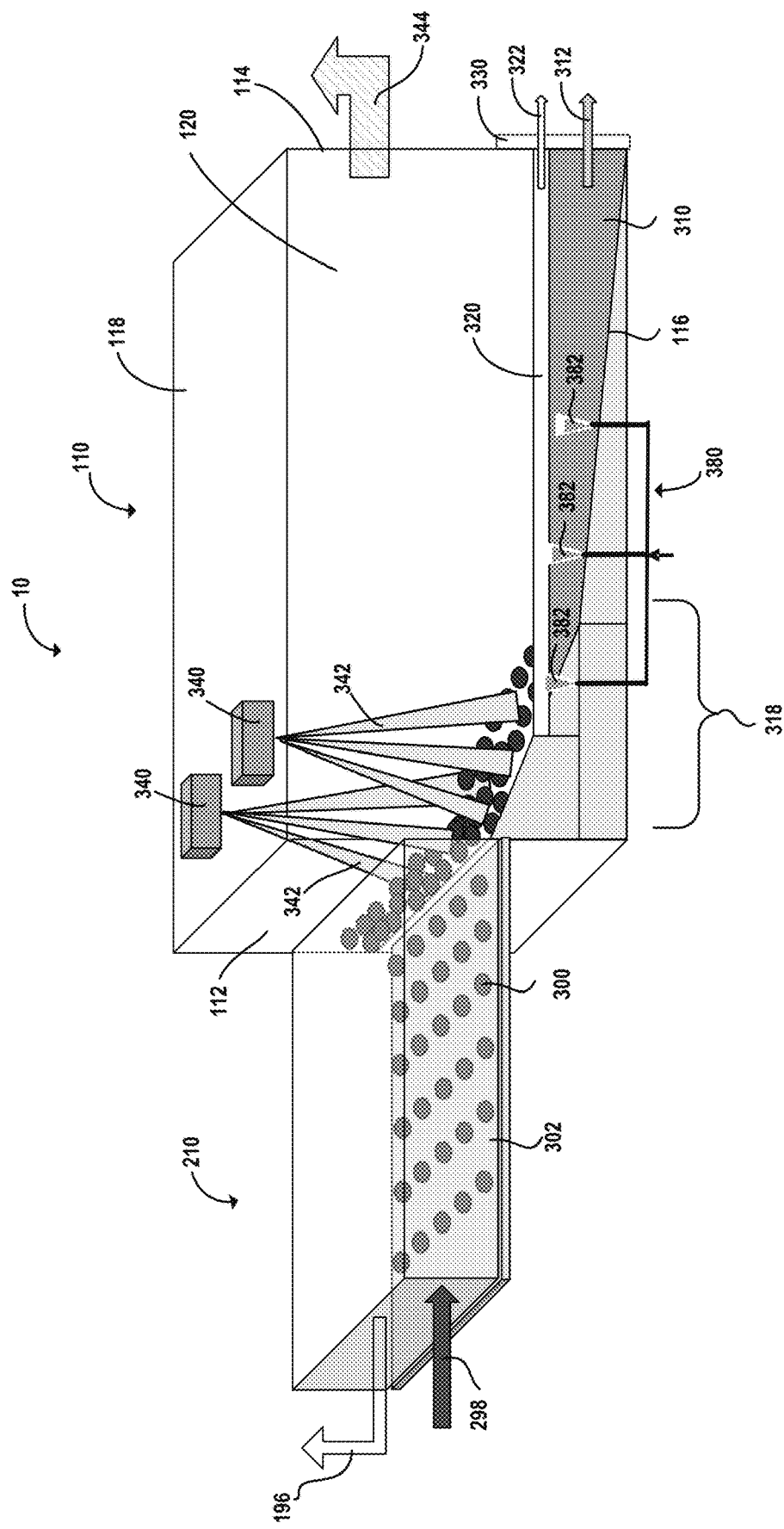
FIG. 2 is a schematic side perspective view of another embodiment of an iron melting system as in FIG. 1, further employing a flue gas-heated preheater upstream of the melting furnace and bottom stirring nozzles to enhance melting and mixing of the charge in the melting furnace.
Figure 12:
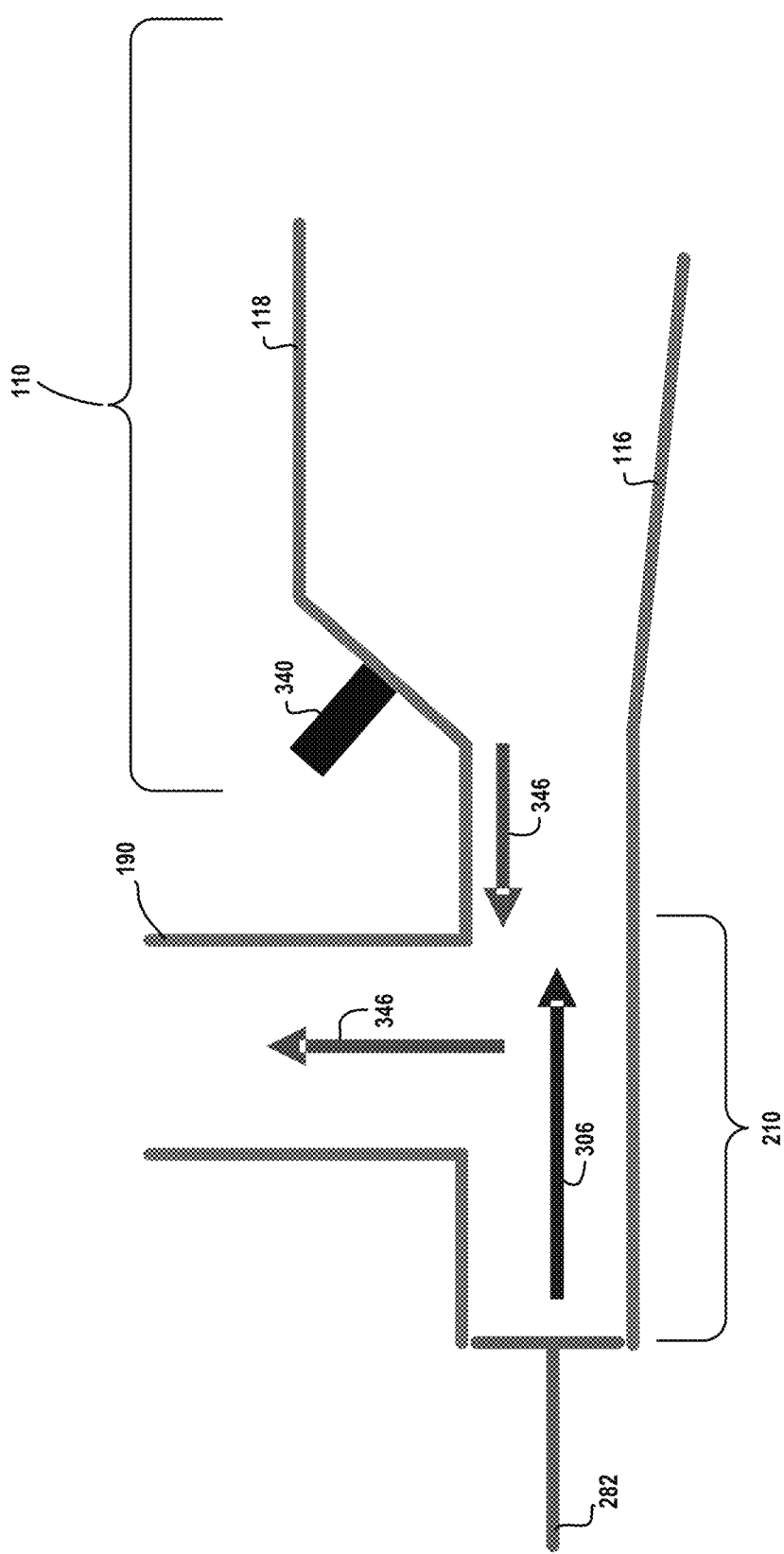
FIG. 12 is a schematic side view of an embodiment of a preheater and a melting zone of an iron melting furnace system.
Figure 13:
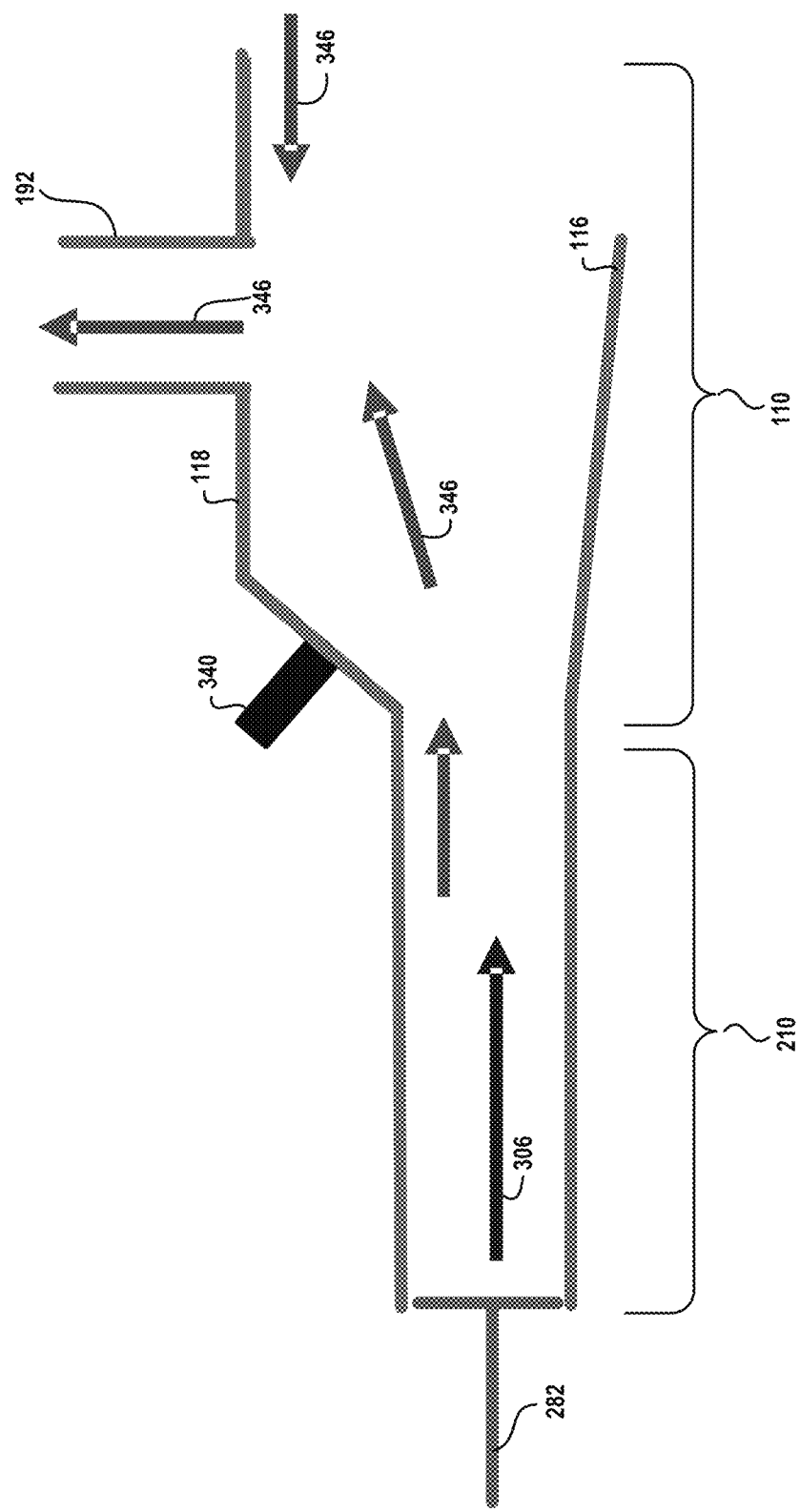
FIG. 13 is a schematic side view of another embodiment of a preheater and a melting zone of an iron melting furnace system.

Combustion products, or flue gases, produced by the at least one burner 340 are directed to at least one flue, which may be positioned in various parts of the furnace 110. As shown in FIG. 1, a flue 344 may be positioned at the discharge end 114. Alternatively, or in combination, as shown in FIG. 2, another flue 196 may be positioned at an inlet end of the preheater 210 to enable the flue gases to transfer heat to the incoming iron pellets 300 prior to charging of the iron pellets 300 into the furnace 110. As shown in FIGS. 12 and 13, flues 190 and 192 may also be positioned elsewhere in the preheater 210 (FIG. 12, flue 190) or in the melting zone 312 of the furnace 110 (FIG. 13, flue 192) to enhance heat transfer to the pelleted iron 300.

As shown in FIG. 2, the furnace 110 may further include a bottom stir apparatus 350 for injecting one or more bottom stir jets 352 through the bottom 116 of the furnace 110 and into the molten charge 320. The bottom stir jets 352 function to stir the molten charge 320 to enhance mixing, integration, and melting of the pelleted iron 300 and to increase homogeneity of the temperature and composition of the molten charge 320. The submerged lances can be used for carbon injection in form of gaseous fuel (preferably natural gas) to reduce iron oxide in DRI to iron.

Figure 3:
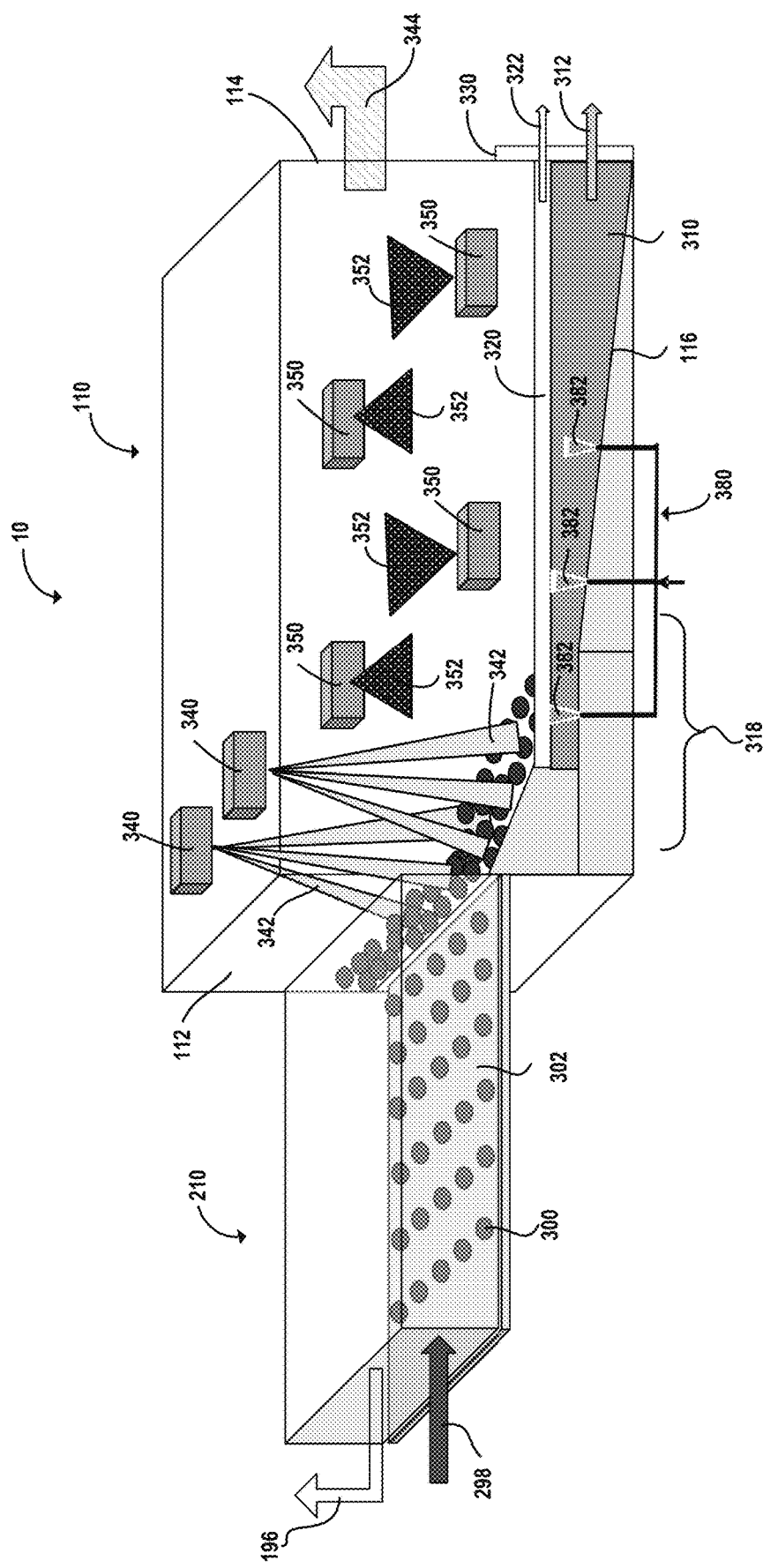
FIG. 3 is a schematic side perspective view of another embodiment of an iron melting system as in FIG. 2, further employing sidewall mounted burners downstream of the melting zone in the melting furnace.

As shown in FIG. 3, the furnace 110 may further include one or more pairs of sidewall mounted burners 380 firing radiant horizontal flames 382 into the furnace 110 above the molten charge 310. The burners 380 provide additional heat to the molten charge 310 to homogenize the charge temperature and ensure that all of the pelleted iron 300 has been melted and integrated into the molten bath. In some embodiments, the at least one roof mounted burner 340 may be operated in a fuel-rich regime so as to inhibit oxidation of the pelleted iron 300 as it is being melted, and the at least one pair of sidewall mounted burners 350 with flames 352 may be operated in a fuel-lean regime to maximize recovery of the heat of combustion of the excess fuel from the roof mounted burner 340. The risk of oxidation due to operating the sidewall mounted burners 350 in a fuel-lean regime is relatively low due to the presence of slag 320 on the top surface of the molten charge 310 downstream of the melting zone 312.

Figure 4:
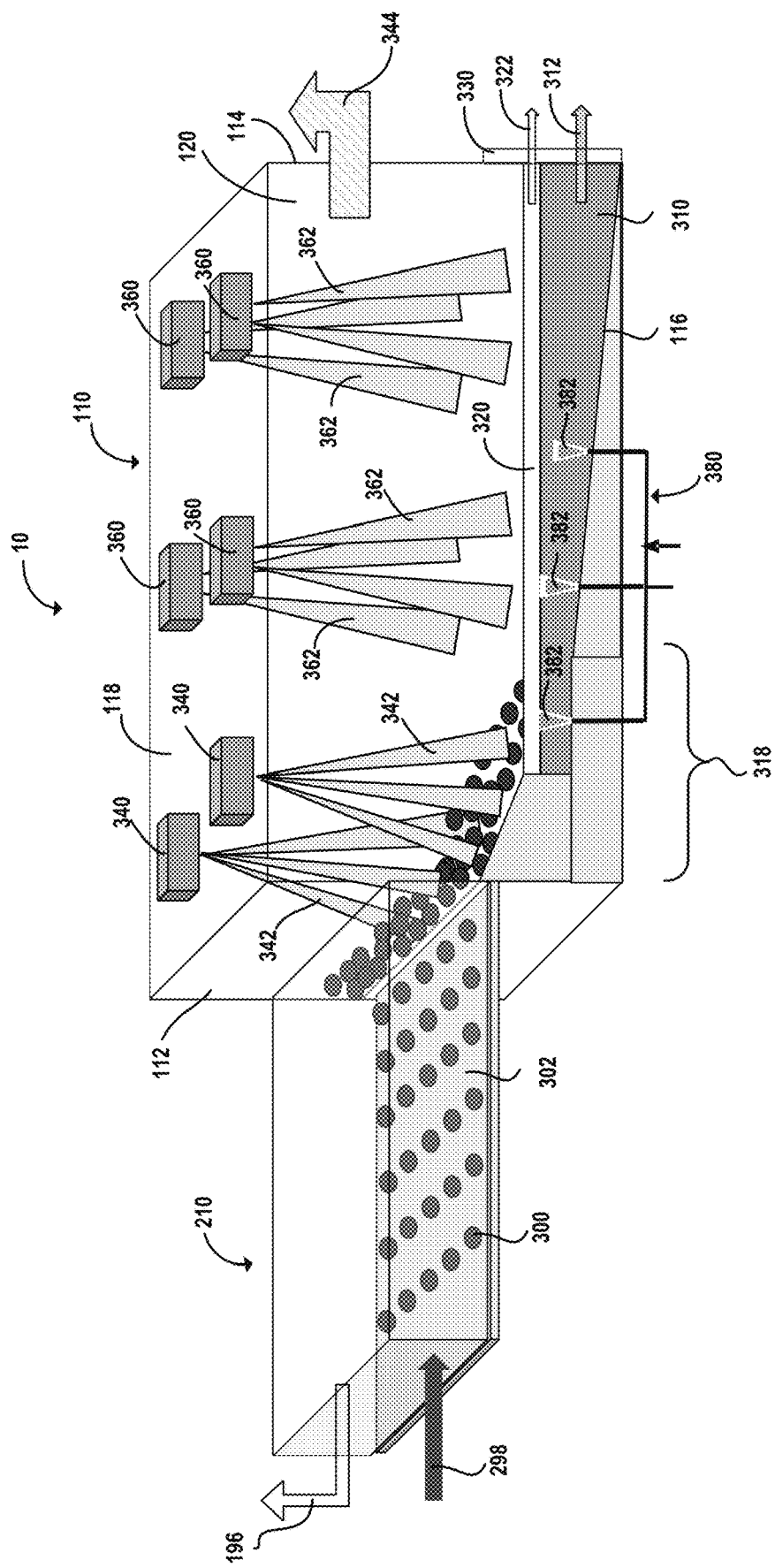
FIG. 4 is a schematic side perspective view of another embodiment of an iron melting system as in FIG. 1, further employing additional roof mounted melting burners in the melting furnace downstream of the melting zone in the melting furnace.

As shown in FIG. 4, the furnace 110 may further include one or more additional roof mounted burners 360 downstream of the melting zone 312 and above the molten charge 310. These may be direct impingement type burners emitting a high momentum flame 362 that contacts the slag 320 on top of the molten charge 320, and may be used to disrupt the slag 320 to enhance heat transfer to the charge. Alternative, or in combination, the burners 360 may emit radiant flames 362.

Figure 5:
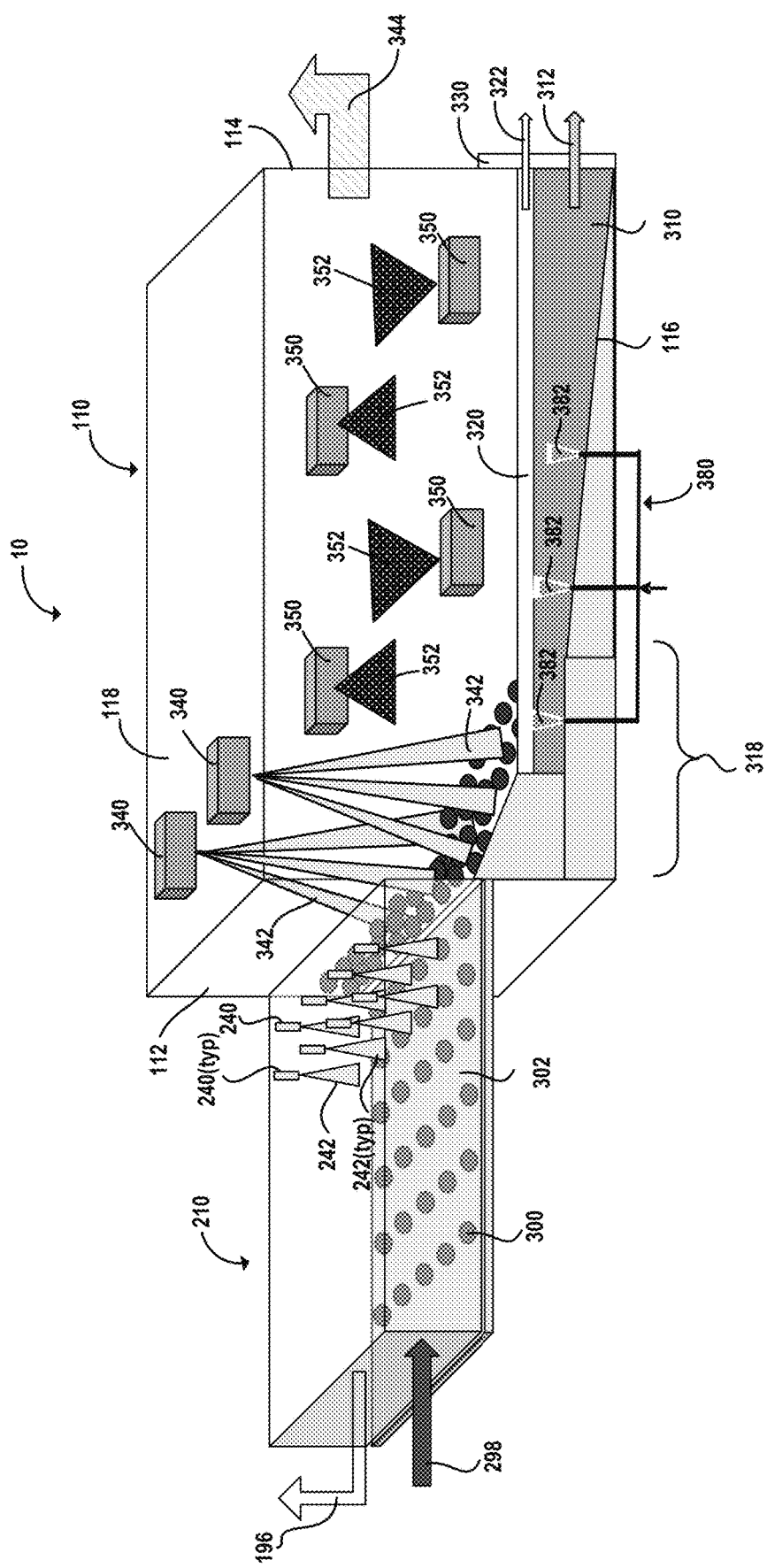
FIG. 5 is a schematic side perspective view of another embodiment of an iron melting system as in FIG. 3, further employing direct flame impingement burners in the preheater.

As shown in FIG. 5, the preheater 210 may include a plurality of direct flame impingement burners 240 emitting flames 242 that contact the pelleted iron 300 being conveyed toward the furnace 110.

Figure 6:
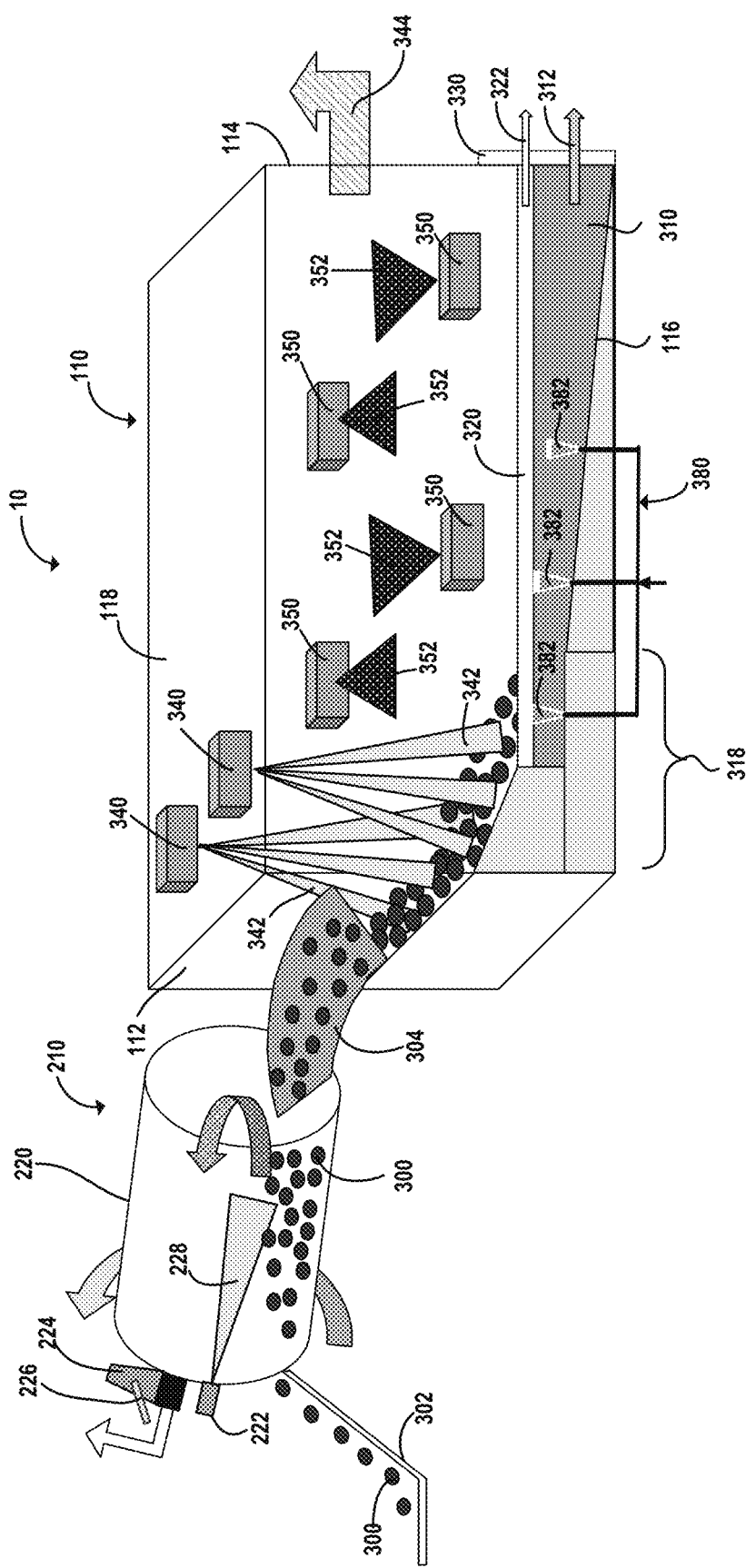
FIG. 6 is a schematic side perspective view of another embodiment of an iron melting system as in FIG. 3, further employing a rotary furnace as the preheater.

Alternatively, as shown in FIG. 6, the preheater 210 may include a rotary furnace 220 through which the pelleted iron 300 passes on its way to the furnace 110. The rotary furnace 220 receives heat input from a burner 222 producing a flame 228, and combustion products are exhausted via a flue 224. A sensor 226 may be used to measure flue gas properties such as temperature and composition, which may be used to control operation of the burner 220 as well as operating parameters of the furnace 220 such as rotational speed and throughput rate.

Figure 7:
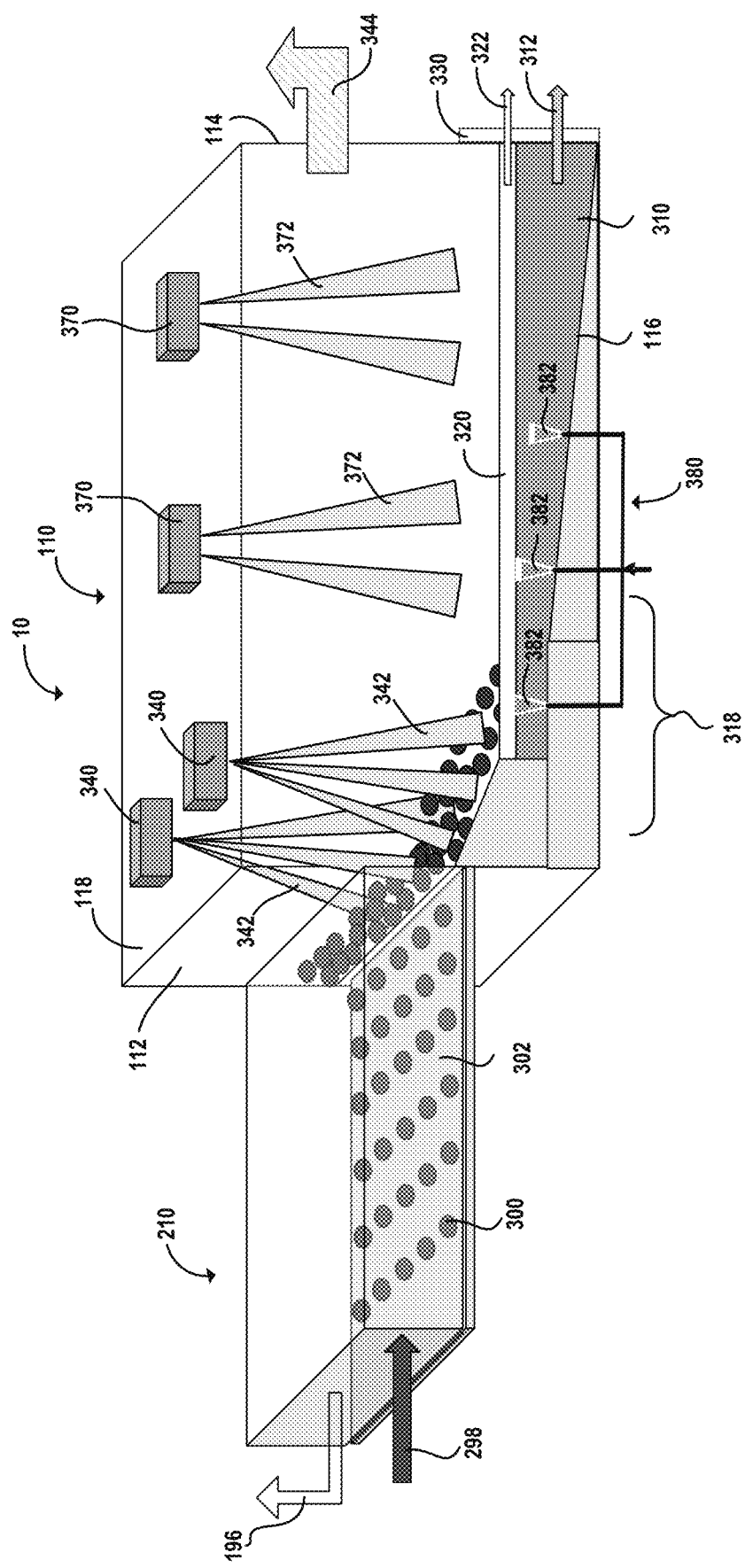
FIG. 7 is a schematic side perspective view of another embodiment of an iron melting system as in FIG. 2, further employing roof mounted burners downstream of the melting zone capable of injecting direct reduced iron fines into the furnace.

As shown in FIG. 7, the furnace 110 may further include one or more injector-burners 370 configured to inject direct reduce iron fines (DRI fines) along with fuel and oxidant into the furnace. The injector-burners 370 assist in reducing loss of DRI fines by injecting them in a manner that allows them to be melted and become integrated into the molten bath. The burners 370 may be mounted in the roof 118 (as shown) or in the sidewalls 120 (not shown), but whether in the roof 118 or the sidewalls 120, the burners 370 are angled downward toward the molten charge 310 to effectively deliver the DRI fines, which are preheated in the burner flame, into the liquid metal bath.

Figure 8:
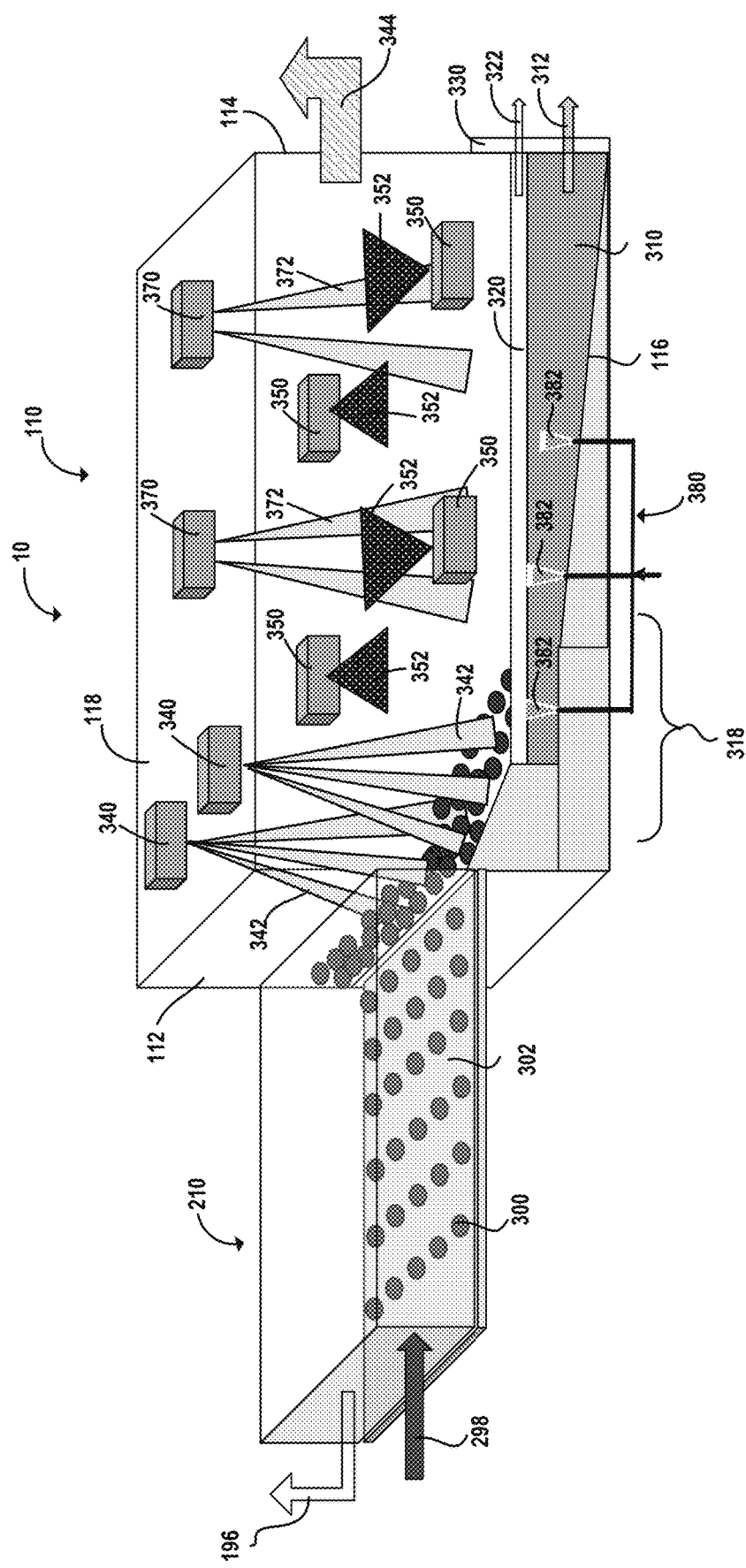
FIG. 8 is a schematic side perspective view of another embodiment of an iron melting system as in FIG. 7, further employing sidewall mounted burners downstream of the melting zone in the melting furnace.

FIG. 8 shows an embodiment of the furnace 110 having both the injector-burners 370 and the sidewall mounted burners 350.

Figure 9:
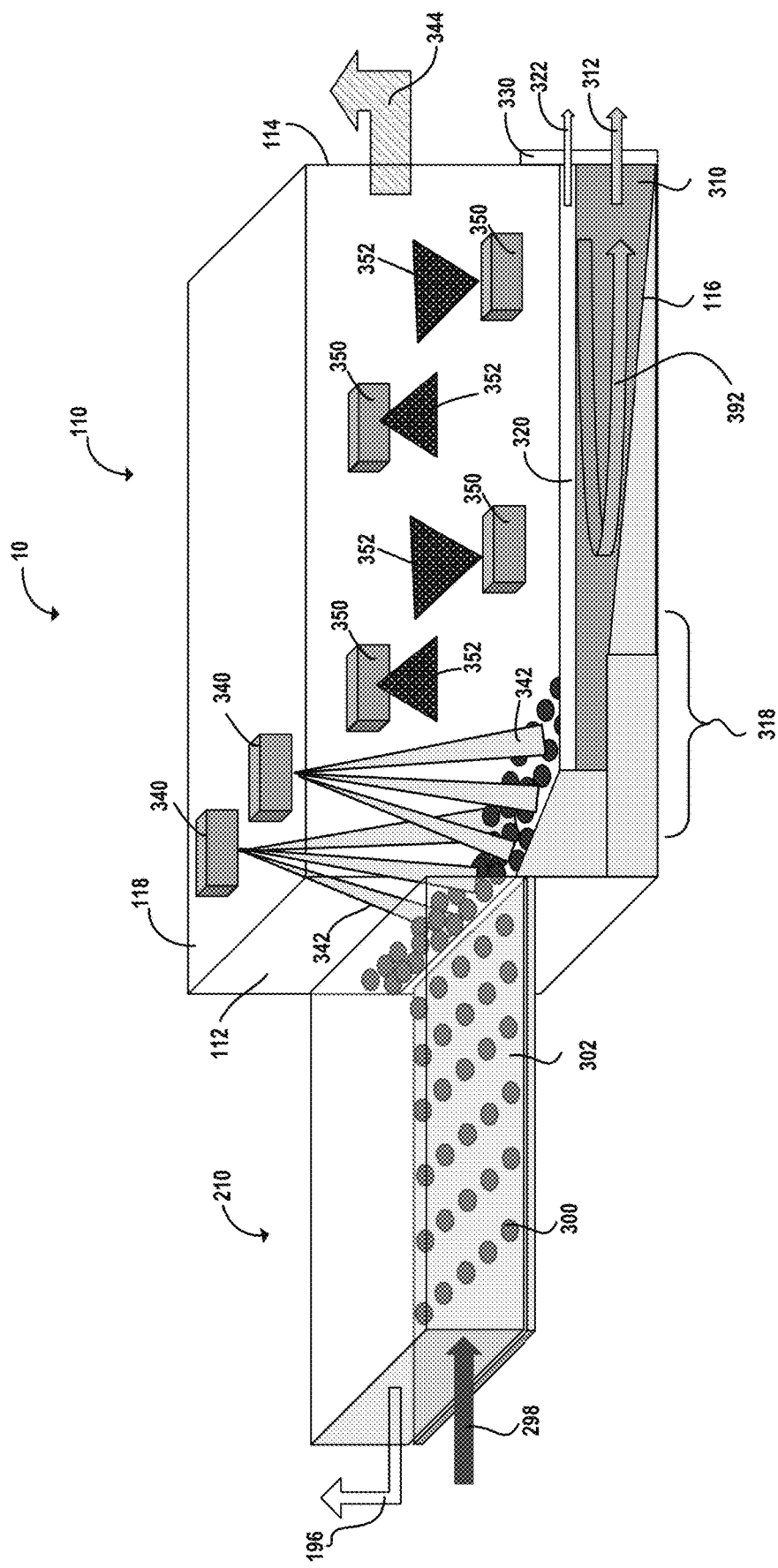
FIG. 9 is a schematic side perspective view of another embodiment of an iron melting system as in FIG. 1, further employing a flue gas-heated preheater upstream of the melting furnace and an electromechanical stirring device to enhance melting and mixing of the charge in the melting furnace.

As shown in FIG. 9, an electromechanical stirring mechanism 392 may be used as an alternative to the bottom stir mechanism 350 to increase mixing, melting, and homogeneity in the molten charge 320.

In any of the embodiments of FIGS. 1-9, or combinations thereof, the iron pellet melting process can operate in a batch semi-continuous or fully continuous mode. Also, in any of the embodiments, the firing rate of any or all of the burners may be modulated or controlled, along with the charge feed rate, to control the rate of heat transfer to the charge. In one example, a burner may be used that can selectively direct a more or less intense flame in a particular direction to increase or decrease the heat transfer rate in a particular part of the furnace, as required.

DRI pellets tend to oxidize, so in some embodiments it may be beneficial to control the atmosphere in the furnace to be slightly reducing or fuel-rich (an equivalence ratio of 1 to 1.1, wherein equivalence ratio indicate the amount of fuel provided as compared with the amount of fuel that would be completely combusted to $CO_2$ and $H_2O$ by the available oxygen). More specifically, controlling the burners to form a slightly reducing atmosphere in the melting zone may be most effective in inhibiting oxidation.

In some embodiments it may be beneficial to employ horizontally-fired burners wherein fuel enters the furnace beneath the point of oxygen injection so as to blanket the molten DRI with a reducing atmosphere.

Figure 16:
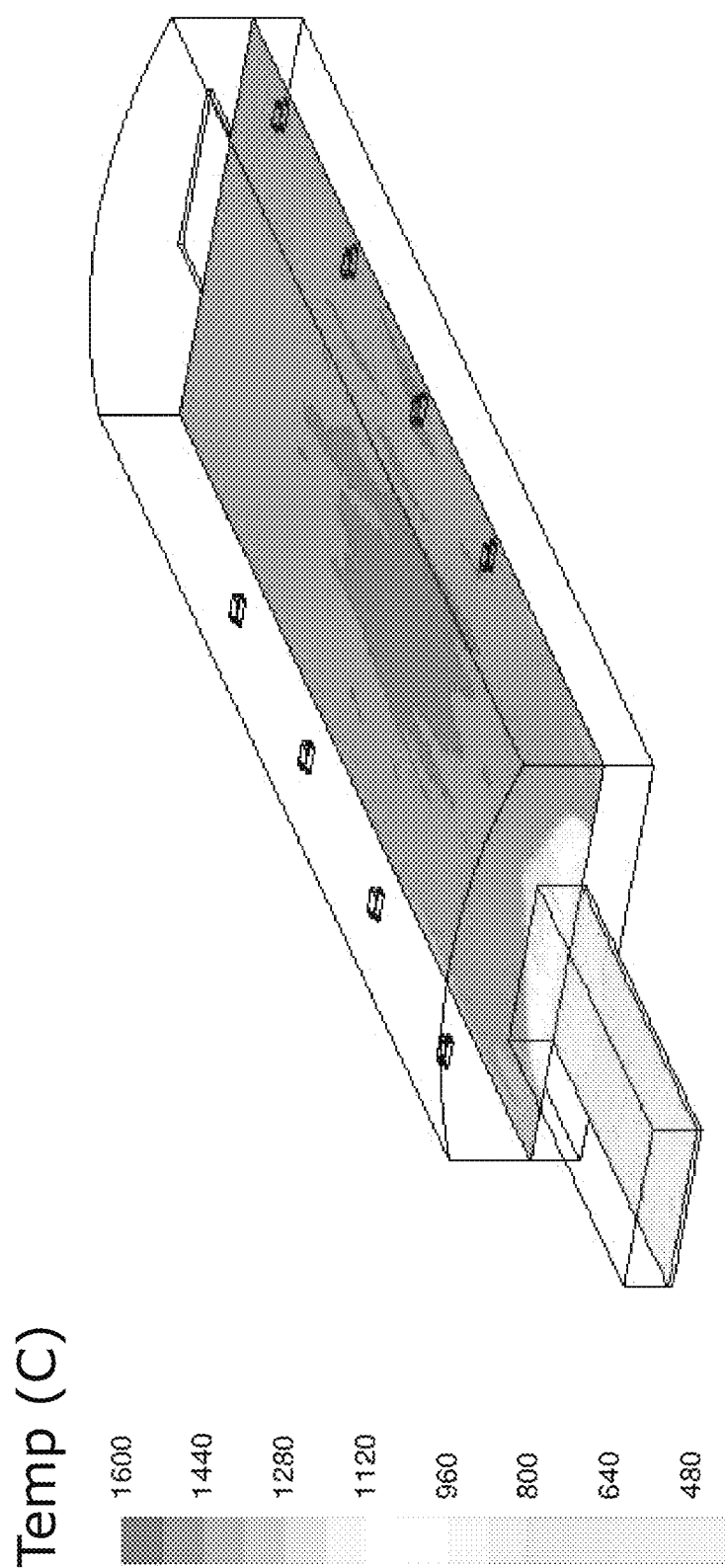
FIG. 16 is a perspective view of a computational fluid dynamic simulation of the effects of a melting system in a furnace as described herein, showing a melting temperature distribution.
Figure 17:
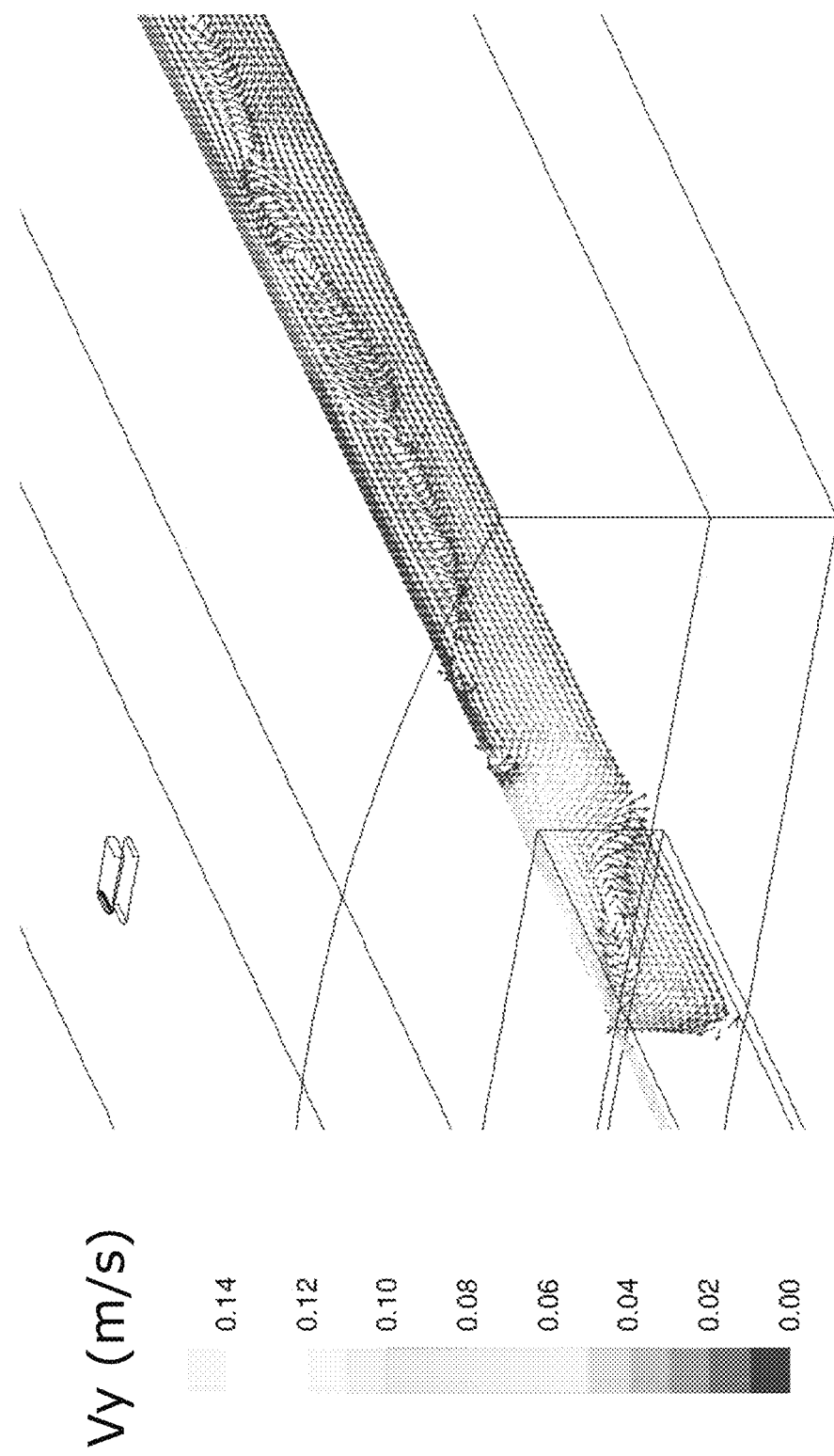
FIG. 17 is a perspective view of a computational fluid dynamic simulation of a melting system in a furnace as described herein, showing a melt flow pattern.

Computational modeling of one such embodiment is shown in FIGS. 16 and 17, which show melt temperature and melt flow pattern, respectively. The modeling results in FIG. 16 indicate that the melt temperature can be achieved via mainly radiation from the burners as long as critical thickness of the slag layer is maintained and natural convection inside the melt is established. As shown in FIG. 17 illustrating melt flow pattern, natural convection inside the molten metal is set up due to temperature difference between the incoming and the exiting material which helps in submerging the incoming material into the molten bath. This convection can be further assisted by gas stirring or electromechanical stirring.

In some embodiments, it may be beneficial to employ multiple flue ducts to divide the flue gas discharging the furnace into multiple streams. In particular, with at least one stream passing over the incoming DRI in a counter-current fashion, and at least another stream discharging elsewhere within the melting space.

In some embodiments, it may be beneficial to operate the upstream end of the furnace at sub-stoichiometric oxygen-to-fuel ratio and discharge these flue gases through a duct located at the downstream end of furnace; wherein staged oxygen is introduced upstream of the said duct to combust unburned fuel prior to the unburned fuel exiting the furnace. Preferably staged oxygen is introduced at a point wherein a relatively inert slag layer separates the molten iron from the staged oxygen to prevent oxidation.

In some embodiments, it may be beneficial to utilize inert (or relatively inert) gas such as N2 or recycled/cleaned flue gas to convey the DRI fines into the furnace so as to reduce the amount of free oxygen coming into contact with the DRI.

In some embodiments, it may be beneficial to discharge most or all flue gas through at least one duct located at the upstream end of the furnace so as to transfer a portion of the flue gas sensible energy into the incoming DRI and/or molten pool of iron in a largely counter current fashion.

In addition, flue gas sensors could be used to measure composition of flue gases along the length and at the flue exit of the furnace to modify and control the generation of desired atmospheres. In addition, or alternatively, temperature and imaging sensors could be used to measure temperature along the length and at the exit of the melting furnace and preheater to control the energy input.

Figure 10:
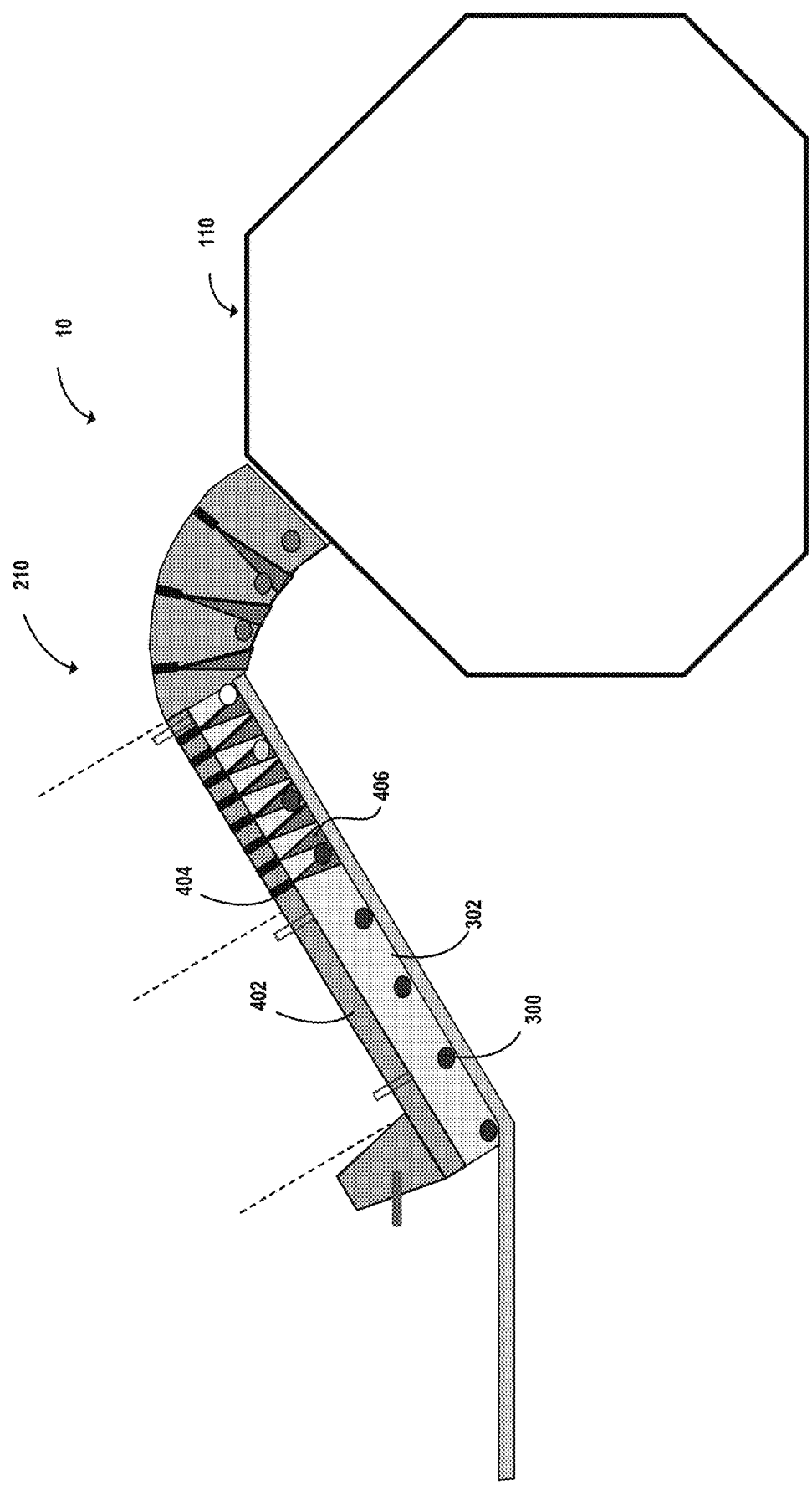
FIG. 10 is a schematic side view of an iron pellet preheater for preheating iron prior to charging into a melting furnace, showing a refractory hood covering a conveyor providing iron pellets to the melting furnace and burners providing heat to the pellets.
Figure 11:
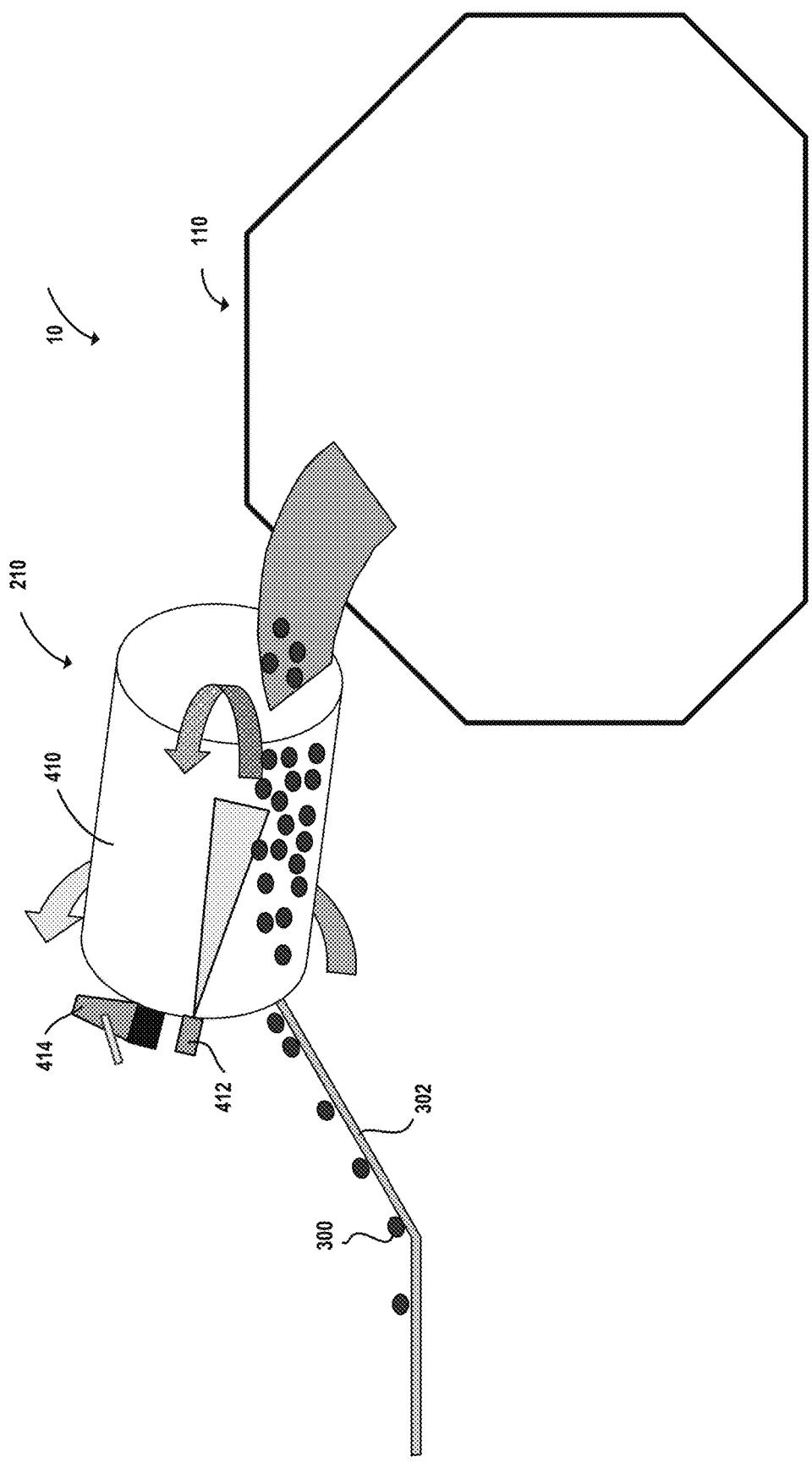
FIG. 11 is a schematic side view of an iron pellet preheater for preheating iron prior to charging into a melting furnace, showing a rotary furnace having a burner for providing heat to the pellets and a flue for exhausting heat from the rotary furnace.

Upstream of the melting furnace 110, a preheater 210 may be provided to increase the efficiency of the overall melting process. As shown in FIG. 10, in one embodiment of a preheater 210, the conveyor 302 for transporting the iron pellets 300 to the furnace 110 is at least partially shrouded by a refractory-lined hood and a plurality of direct impingement burners are positioned to fire onto the iron pellets 300. Alternatively, as shown in FIG. 11, in another embodiment of a preheater 210, the conveyor 302 transports the iron pellets 300 into a preheater furnace or vessel that is configured as a rotary furnace having at least one burner and a flue. These embodiments of preheaters are described in greater detail in U.S. application Ser. No. 16/025,230 filed on Jul. 2, 2018, which is incorporated herein by reference in its entirety.

The preheater 210 may also use hot flue gases from the furnace 110 flowing in a countercurrent with respect to the direction of the DRI pellets 300, thereby assisting with preheating. Preferably, the preheater furnace is lined with special refractory coatings to reflect and re-readiate energy back to the DRI pellets. The burner firing rate and residence time in preheater furnace can be controlled based on requirement to achieve a target average heat content/temperature of the charged pellets using sensors in the preheater furnace.

Figure 14:
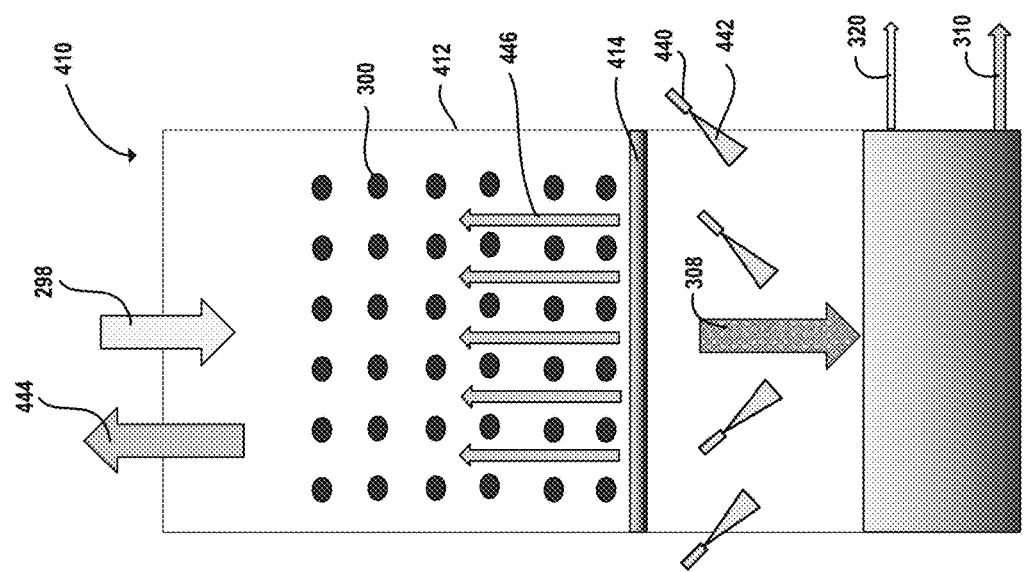
FIG. 14 is a schematic side view of another embodiment of an iron melting system using a cupola.

Alternative configurations of a melting furnace are envisioned. In one example, as shown in FIG. 14, a melting furnace 410 can be configured in the form of a cupola or shaft furnace, wherein a charge 298 of iron pellets 300 is provided into the top of the furnace 410 so as to flow vertically downward. The furnace 410 is partitioned by a grate or screen 414 so that solid pellets 300 are retained above the grate 414 and molten iron 308 is permitted to drain downward into a molten bath of liquid metal 310 covered by a layer of slag 320. A plurality of burners 440 are positioned in a lower portion of the furnace 410 below the grate 414 to fire flames 442 in the direction of the molten bath. The hot combustion products or flue gases 446 from the burners 440 flows upward through the grate 414 and intimately contacts the solid iron pellets 300 above the grate, thereby heating and melting the pellets 300. Cooled flue gases 444 are exhausted from the top of the furnace 410.

Figure 15:
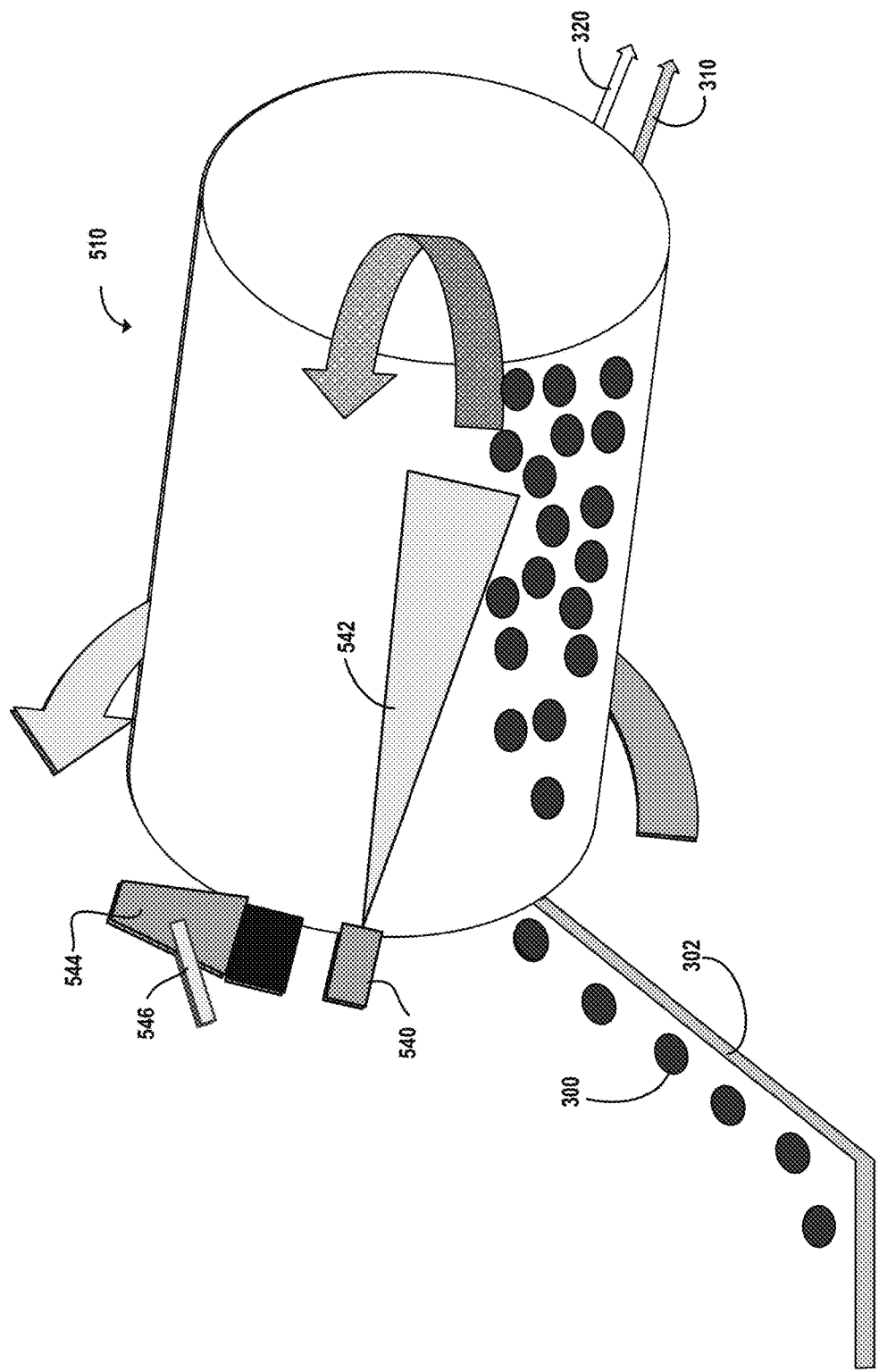
FIG. 15 is a schematic side view of another embodiment of an iron melting system using a rotary furnace.

In another example, as shown in FIG. 15, a melting furnace 510 can be configured in the form of a rotary furnace. The conveyor 302 provides iron pellets 300 to the furnace 510, which rotates about its axis to enhance mixing of the pellets and heat transfer from the hot refractory walls of the furnace to the pellets. At least one burner 540 provides heat to the furnace 510 via a flame 542, and combustion products exit the furnace 510 through a flue 544. A sensor 546 in the flue may be used to measure temperature and/or exhaust composition, which may be used to control operation of the burner 540. Molten iron charge 310 and slag 320 are discharged from the furnace 510.

While the principles of the invention have been described above in connection with preferred embodiments, it is to be clearly understood that this description is made only by way of example and not as a limitation of the scope of the invention.

The invention claimed is:

1. A system for melting a pelleted charge material comprising:
   a furnace having a feed end configured to receive a solid pelleted charge material and a discharge end opposite the feed end configured to discharge a molten charge material and a slag;
   a conveyor configured to feed the pelleted charge material into the feed end of the furnace;
   at least one oxy-fuel burner positioned to direct heat into a melting zone near the feed end to heat and at least partially melt the pelleted charge material to form the molten charge material and slag, wherein the oxy-fuel burner uses an oxidant having at least 70% molecular oxygen;
   at least one flue for exhausting burner combustion products from the furnace; and
   a stirring mechanism for stirring the molten charge material and facilitating mixing of the pelleted charge material into the molten charge material in the melting zone, wherein the stirring mechanism is selected from the group consisting of: one or more bottom stir nozzles for injecting an inert gas through the bottom of the furnace, and an electromechanical stirring device;
   wherein the pelleted charge material comprises one or more of iron pellets, direct reduced iron pellets, and hot briquetted iron pellets; and
   wherein the furnace has a length and a width, wherein the charge material moves horizontally in a lengthwise direction from the feed end to the discharge end, and wherein the at least one burner is positioned near the feed end, the length being at least twice the width; and
   wherein at least a portion of the bottom is sloped downward from the feed end toward the discharge end to enable gravity to assist in moving charge material from the feed end to the discharge end.

2. The system of claim 1, wherein the at least one oxy-fuel burner and the flue are both positioned at or near the feed end of the furnace.

3. The system of claim 1, wherein the at least one oxy-fuel burner is positioned in the sidewall of the furnace.

4. The system of claim 1, further comprising a mechanism for separating the slag from the molten charge material.

5. The system of claim 1, further comprising:
   a preheater adjacent to the feed end of the furnace having an energy input device for preheating the pelleted charge material prior to the charge material being fed into the furnace.

6. The system of claim 5, wherein the energy input device includes a preheating burner and a flue configured to discharge at least a portion of the burner combustion products from the furnace, and wherein the energy input device heats the pelleted charge material on the conveyor.

7. The system of claim 5, wherein the energy input device heats the pelleted charge material in a preheater furnace configured to discharge preheated pelleted charge material onto the conveyor.

8. The system of claim 1, further comprising a controller programmed to operate the at least one oxy-fuel burner in the melting zone in a fuel-rich mode to inhibit oxidation of the charge material.

9. The system of claim 1, wherein the at least one oxy-fuel burner is a direct-impingement burner producing a flame that directly impinges the pelleted charge material to maximize heat transfer to the pelleted charge material.

10. The system of claim 1, further comprising at least one injector-burner downstream of the melting zone configured to inject direct reduced iron fines into the furnace.

* * * * *